United States Patent
Buethe et al.

(10) Patent No.: US 9,446,838 B2
(45) Date of Patent: Sep. 20, 2016

(54) SYSTEMS FOR INCEPTOR CONTROL IN FLY-BY-WIRE AIRCRAFT SYSTEMS

(71) Applicant: Gulfstream Aerospace Corporation, Savannah, GA (US)

(72) Inventors: Scott Buethe, Savannah, GA (US); Robert Hartley, Savannah, GA (US); Francois Hugon, Savannah, GA (US); Thomas Landers, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 101 days.

(21) Appl. No.: 14/459,566

(22) Filed: Aug. 14, 2014

(65) Prior Publication Data
US 2016/0046364 A1 Feb. 18, 2016

(51) Int. Cl.
*B64C 13/50* (2006.01)
*G05D 1/00* (2006.01)

(52) U.S. Cl.
CPC .............. *B64C 13/503* (2013.01); *G05D 1/00* (2013.01)

(58) Field of Classification Search
CPC ........................... B64C 13/508; B64C 13/04
See application file for complete search history.

(56) References Cited

U.S. PATENT DOCUMENTS

| | | | | |
|---|---|---|---|---|
| 6,732,979 B1* | 5/2004 | Kilner | ..................... | B64C 25/50 180/402 |
| 7,513,456 B2* | 4/2009 | Lindahl | ................... | B64C 25/50 244/100 R |
| 8,050,780 B2* | 11/2011 | Tessier | ................... | B64C 13/04 244/229 |
| 8,087,619 B2* | 1/2012 | Hanlon | ................... | B64C 13/04 244/223 |
| 2003/0032523 A1* | 2/2003 | Kato | ..................... | F16H 61/16 477/115 |

* cited by examiner

*Primary Examiner* — Justin Benedik
(74) *Attorney, Agent, or Firm* — Lorenz & Kopf, LLP (LKGlobal)

(57) ABSTRACT

Aircraft, control-by-wire systems, and controllers are provided. The aircraft includes a flight control surface and a control-by-wire system. The control-by-wire system includes an input device and a controller. The input device is configured to control the flight control surface. The controller is communicatively coupled with the input device and configured to automatically offset a neutral force position of the input device based on a deviation of the aircraft from a reference condition while the aircraft is operated in a manual flight mode.

20 Claims, 3 Drawing Sheets

SYSTEMS FOR INCEPTOR CONTROL IN FLY-BY-WIRE AIRCRAFT SYSTEMS

TECHNICAL FIELD

The technical field relates generally to inceptor control in fly-by-wire aircraft systems, and more particularly relates to adjusting an inceptor neutral force position of a fly-by-wire aircraft system in manual flight mode.

BACKGROUND

A conventional aircraft typically includes flight control surfaces that are mechanically coupled with a flight control input device. The flight control surfaces alter the aerodynamic forces on the aircraft to adjust the pitch, roll, or yaw angles of the aircraft. Feedback forces from the aerodynamic effect on the flight control surfaces are transferred through the mechanical connection to the flight control input device, which is also known as an inceptor. These feedback forces indicate various flight conditions to the pilot of the aircraft.

With the advent of fly-by-wire technology over the past half century, the definition of a conventional aircraft is changing. Fly-by-wire technology mechanically decouples the inceptor from the flight control surfaces. Instead, the flight control surfaces are adjusted by actuators that are electronically coupled with the inceptor.

Several techniques have been developed for controlling the inceptor feedback in such fly-by-wire systems. A typical fly-by-wire inceptor provides a single neutral force position to the pilot regardless of the flight conditions of the aircraft. The neutral force position is the position of the inceptor in the absence of external forces. A null or zero coordinate position is typically selected as the neutral force position in such single neutral force position systems. While such systems are suitable for their intended purpose, the need for improved fly-by-wire systems is essentially constant.

As such, it is desirable to provide a fly-by-wire system with improved inceptor controls. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, control-by-wire systems, and controllers are disclosed herein.

In a first non-limiting embodiment, an aircraft includes, but is not limited to, a flight control surface and a control-by-wire system. The control-by-wire system includes an input device and a controller. The input device is configured to control the flight control surface. The controller is communicatively coupled with the input device and configured to automatically offset a neutral force position of the input device based on a deviation of the aircraft from a reference condition while the aircraft is operated in a manual flight mode.

In a second non-limiting embodiment, a control-by-wire system for a vehicle includes, but is not limited to, a primary control input device and a controller. The controller is communicatively coupled with the vehicle and is configured to automatically offset a neutral force position of the primary control input device based on a deviation of the vehicle from a reference configuration while the vehicle is operated in a manual operation mode.

In a third non-limiting embodiment, a controller for use with a control-by-wire system includes, but is not limited to, a processor and a memory unit coupled with the processor. The memory unit stores instructions for the processor. The instructions are configured to cooperate with the processor to electronically communicate with an input device configured to control a flight control surface, and automatically offset a neutral force position of the input device based on a deviation of an aircraft from a reference condition while the aircraft is operated in a manual flight mode.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
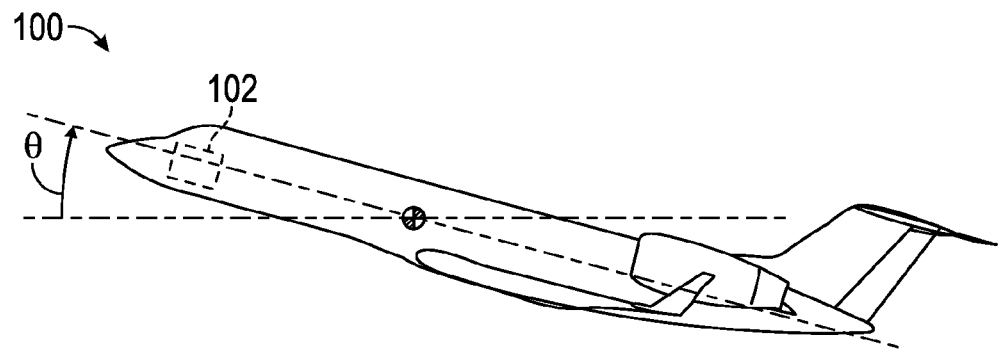
FIG. 1 is a simplified block diagram of an airplane in accordance with some embodiments.

Referring now to FIG. 1, an example of an airplane 100 with a fly-by-wire system 102 is illustrated in accordance with some embodiments. Although airplane 100 is described in this description, it should be appreciated that the fly-by-wire system 102 may be any control-by-wire system utilized in other aircraft, land vehicles, water vehicles, space vehicles, or other machinery without departing from the scope of the present disclosure. For example, the fly-by-wire system 102 may be utilized in submarines, helicopters, airships, spacecraft, cars, or machinery (e.g., to control an arm of a crane). In some embodiments, fly-by-wire system 102 is located remotely from airplane 100, such as for an unmanned aerial vehicle. Airplane 100 is illustrated in flight with a pitch angle θ relative to a horizontal plane, as will be appreciated by those of ordinary skill in the art.

Figure 2:
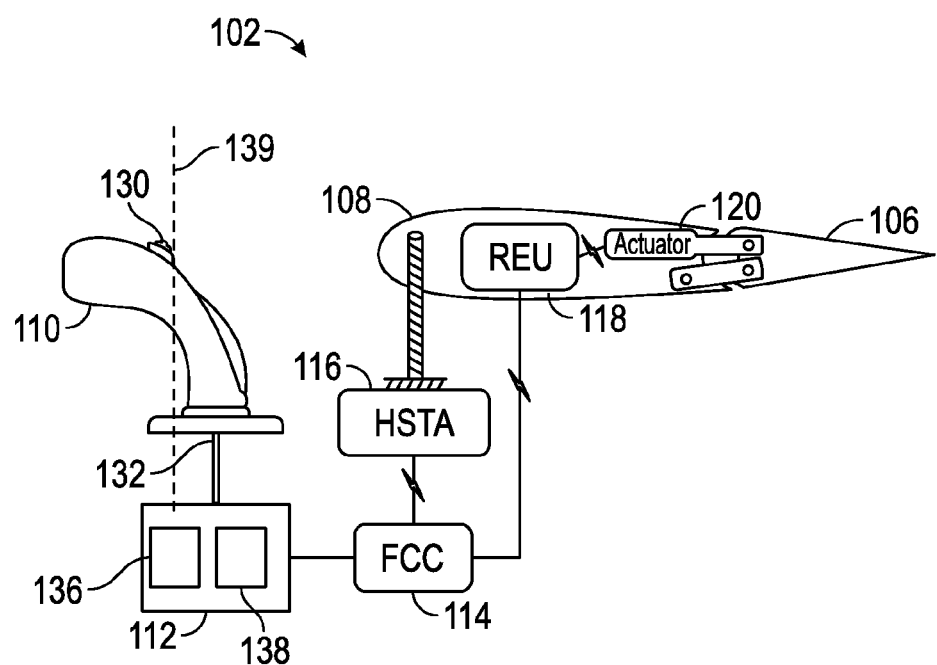
FIG. 2 is a simplified block diagram of a fly-by-wire system in accordance with some embodiments.

Referring now to FIG. 2, an example of fly-by-wire system 102 is illustrated in accordance with some embodiments. As used herein, the term "fly-by-wire" encompasses all systems in which an input device is mechanically operationally disconnected from a machine or portions of a machine that are controlled by the input device. For example, fly-by-wire as used herein encompasses terms used for the specific technology used to communicate commands between the input device and an electronic controller, such as fly-by-light or fly-by wireless. As used herein, control-by-wire is a term that encompasses fly-by-wire, as well as systems used to control vehicles or machines other than for flight.

In the example provided, fly-by-wire system 102 is configured to control flight control surfaces of airplane 100, such as an elevator 106 and a horizontal stabilizer 108. Elevator 106 adjusts pitch angle θ of airplane 100. Horizontal stabilizer 108 is a trim device that relieves some of the force required to maintain elevator 106 at the present position, as will be appreciated by those with skill in the art. It should be appreciated that fly-by-wire system 102 may utilize alternative elevator and trim configurations without departing from the scope of the present disclosure.

Fly-by-wire system 102 includes an inceptor 110, an inceptor control module 112, and a flight control computer (FCC) 114. In the example provided, fly-by-wire system 102 controls elevator 106 and horizontal stabilizer by use of a horizontal stabilizer trim actuator (HSTA) 116, a remote electronic unit (REU) 118, and a hydraulic actuator 120. It should be appreciated that fly-by-wire system 102 may have other configurations and may be coupled with additional or alternative components without departing from the scope of the present disclosure.

Inceptor 110 is a pilot input device that is in electronic communication with FCC 114 to manipulate control surfaces of airplane 100. In the example provided, inceptor 110 is a primary control input device that, in cooperation with inceptor control module 112 and flight control computer 114, permits a pilot to manipulate elevator 106 to adjust the pitch axis of airplane 100, and may be a control column, a side stick, or other suitable device. It should be appreciated that multiple inceptors 110 may be utilized to permit two pilots or operators to control the vehicle, either individually or in concert. Primary control refers to controls whose input is typically used to directly control a system. Primary control systems in airplanes typically include ailerons, the elevator (or stabilator), and the rudder. In an automobile, for example, a steering wheel or inceptor, gas pedals, and brake pedals are primary control input devices.

Inceptor 110 includes a trim control 130 and an inceptor rod 132. Trim control 130 is a secondary control input device configured to adjust a trim condition of airplane 100, and may take the form of a switch, knob, or other suitable input device. For example, trim control 130 may manipulate horizontal stabilizer 108, as will be appreciated by those of ordinary skill in the art. Secondary control refers to controls whose input is not typically used while directly controlling the system. Secondary control systems in an airplane may include wing flaps, leading edge devices, spoilers, trim systems, and other systems to improve the performance characteristics of the airplane or relieve the pilot of excessive control forces. Secondary control in automobiles, for example, may include parking brakes, cruise control, or similar systems. Inceptor rod 132 extends out from a bottom of a handle portion of inceptor 110.

Inceptor control module 112 receives inceptor rod 132 and is coupled for electronic communication with FCC 114. Inceptor control module 112 includes an inceptor sensor 136 and an actuator 138. Inceptor sensor 136 may be any sensor capable generating a signal for FCC 114 that indicates the position of inceptor 110. For example, inceptor sensor 136 may be a force sensor that detects a force applied to inceptor 110 by a pilot, as will be described below with reference to FIG. 3. In some embodiments, inceptor sensor 136 may directly measure deflection of inceptor rod 132. For example, FIG. 2 illustrates inceptor 110 in a null position where inceptor rod 132 is parallel with a pitch null axis 139. The null position is the position at which inceptor 110 rests when there are no external forces exerted on inceptor 110 by a pilot or actuator 138. In contrast, a zero or neutral force position is a position at which inceptor 110 rests after application of forces by actuator 138 in the absence of forces exerted by the pilot.

Actuator 138 exerts forces on inceptor rod 132 to provide feedback to the pilot of airplane 100 and urge inceptor 110 towards the neutral force position of inceptor 110. Actuator 138 receives signals generated by FCC 114 to determine the amount of force to apply to inceptor rod 132 based on the method described below. Actuator 138 may be an electric motor or other suitable device capable of providing a force to inceptor rod 132.

FCC 114 is coupled for electronic communication with inceptor control module 112, HSTA 116, REU 118, and various other sensors and components of airplane 100. FCC 114 includes the control logic illustrated in FIG. 3 below that performs the method described below. FCC 114 generates signals to command actuator 138, HSTA 116, and REU 118 to perform various operations. For example, when a pilot deflects inceptor 110, FCC 114 commands REU 118 to control hydraulic actuator 120 and rotate elevator 106 based on the signal generated by inceptor sensor 136.

Figure 3:
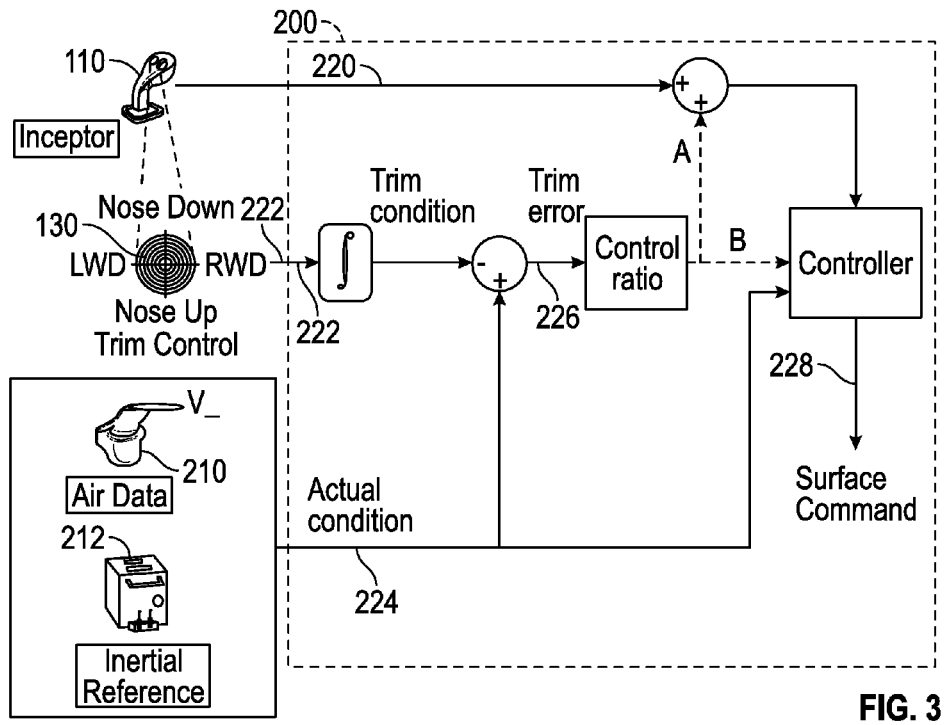
FIGS. 3-4 are simplified block diagrams of control logic in accordance with some embodiments.

Referring now to FIG. 3, control logic 200 is illustrated in accordance with some embodiments. In the embodiment provided, control logic 200 is implemented in FCC 114. In some embodiments, the various operations performed by control logic 200 may be separated into multiple controllers or computers, or may be a standalone controller. Control logic 200 may include any combination of software and hardware. For example, control logic 200 may include an application specific integrated circuit (ASIC), an electronic circuit, a processor (shared, dedicated, or group) and memory that execute one or more software or firmware programs, a combinational logic circuit, and/or other suitable components that provide the described functionality. In some embodiments, control logic 200 is stored as instructions on a non-transitory computer readable medium. The instructions may be executed to cause one or more processors to perform the operations described below.

Control logic 200 receives input signals from inceptor 110, trim control 130, air data sensors 210, and an inertial reference module 212. In the example provided, control logic 200 receives an inceptor signal 220 generated by inceptor 110, a trim condition signal 222 generated by trim control 130, and an actual condition signal 224 generated by air data sensors 210 and inertial reference module 212. For example, inceptor signal 220 may indicate a position of or input force on inceptor 110, trim condition signal 222 may indicate a trim condition (e.g., trimmed airspeed), and actual condition signal 224 may indicate a current condition (e.g., current airspeed). Control logic 200 calculates a trim error 226 based on trim condition signal 222 and actual condition signal 224. Based on inceptor signal 220 and trim error 226, control logic 200 generates a surface command signal 228 to command flight surfaces of airplane 100.

In one exemplary baseline controller, control logic 200 is a G-command system with speed stability, where the displacement of inceptor 110 commands a normal acceleration response and the deviation from the trim condition (airspeed in this example) creates an additional G-command that augments the pilot's input through path "A" or path "B". Other embodiments may use different parameters for control and trim, such as (but not limited to) flight path angle, angle of attack, or pitch rate.

Figure 4:
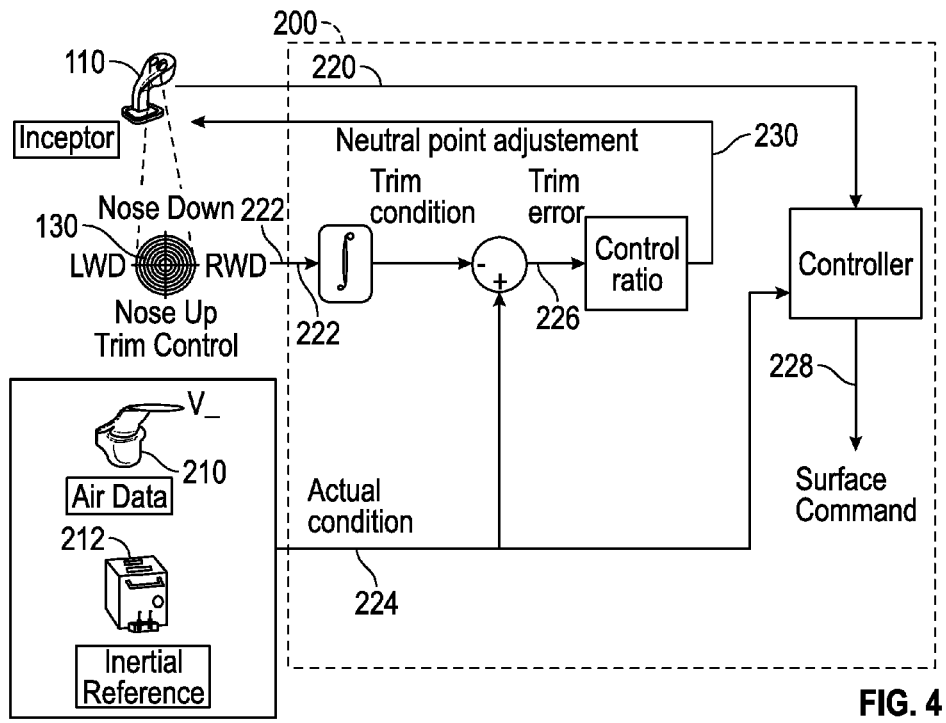

Referring now to FIG. 4, control logic 200' is illustrated in accordance with some embodiments. Control logic 200' is similar to control logic 200, where like numbers refer to like components. Control logic 200', however, is adjusted to allow trim error 226 to offset the zero-force position of inceptor 110. For example, control logic 200' may generate a neutral point adjustment signal 230 for use in generating a force on inceptor 110. The overall behavior of the system is unchanged, since control logic 200' still seeks the trim condition, but the controller behavior can be directly noticed by the pilot via the changing forces or positions of inceptor 110.

Figure 5:
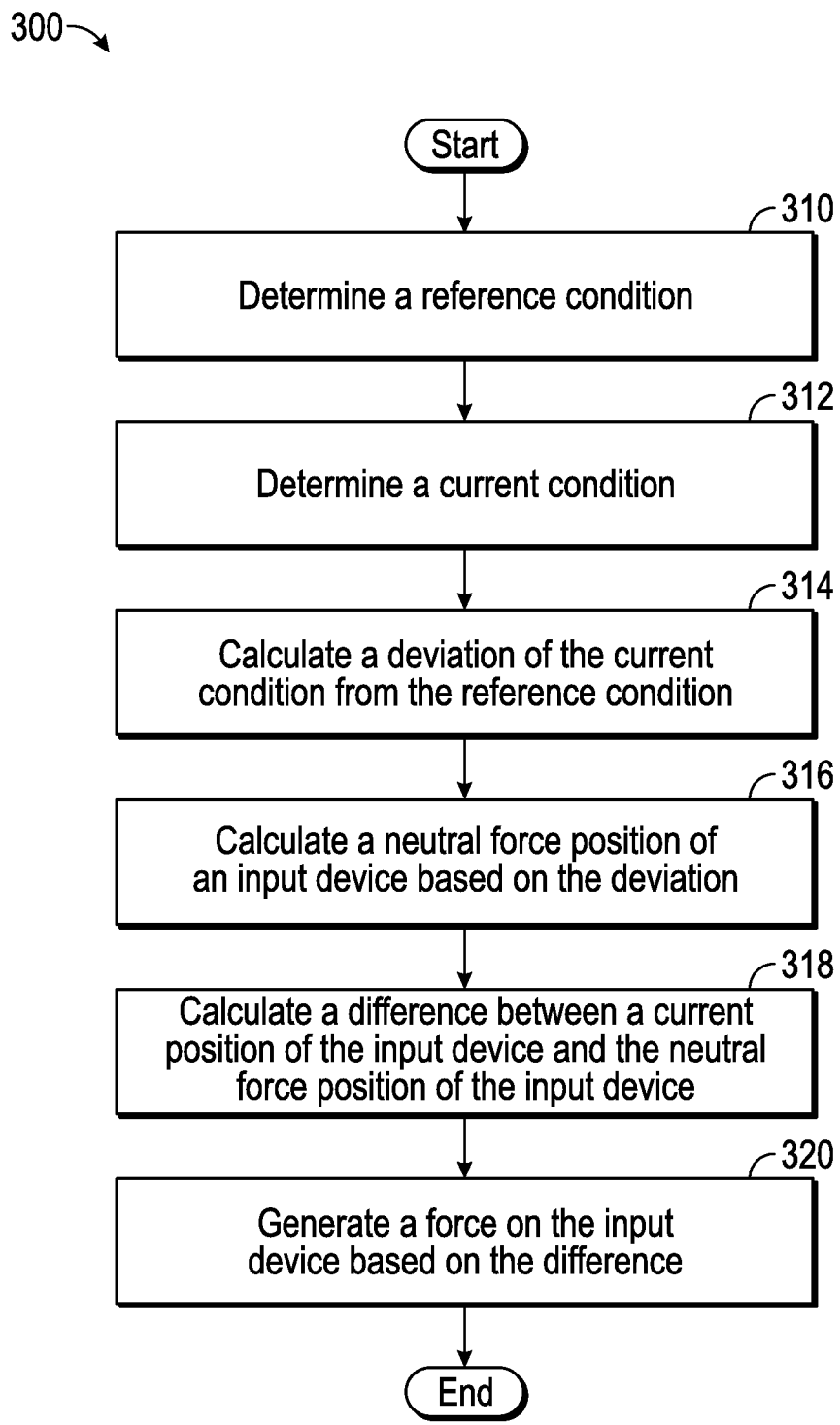
FIG. 5 is a simplified flow diagram of operations of a method in accordance with some embodiments.

Referring now to FIG. 5, a method 300 is illustrated in flow diagram form in accordance with some embodiments. In the example provided, operations of method 300 are performed by FCC 114 and control logic 200. Operations of method 300 are performed during manual control of airplane 100 to provide awareness of aircraft conditions to a pilot.

Operation 310 determines a reference condition of a system. The reference condition is a condition associated with secondary controls of the system. In some embodiments, the reference condition is independent of input from primary controls of the system. For example, trim condition signal 222 may be determined based on an input from trim control 130 independent of a position of inceptor 110. It should be appreciated that many other types of reference conditions may be utilized without departing from the scope of the present disclosure. For example, method 300 may be performed based on a roll axis or yaw axis of airplane 100, as will be appreciated by those of ordinary skill in the art. In some embodiments, the reference condition is a reference angle-of-attack of airplane 100. Angle-of-attack is the angle between the chord line of the wing and the vector representing the relative motion between the aircraft and the atmosphere, as will be appreciated by those with skill in the art.

Operation 312 determines a current condition of a system. The current condition is of the same type as the reference condition. For example, when the reference condition is indicated by trim condition signal 222, the current condition may be an airspeed of airplane 100 that is indicated by actual condition signal 224 based on air data generated by air data sensors 210. When the reference condition is the reference angle-of-attack, for example, the current condition is the current angle-of-attack. Operation 314 calculates a deviation of the current condition from the reference condition. For example, control logic 200' may calculate a difference between the trim condition signal 222 and the actual condition signal 224 to determine trim error 226.

Operation 316 calculates a neutral force position of an input device based on the deviation from the reference condition. For example, control logic 200' may generate neutral point adjustment signal 230 as the neutral force position, as described above. Operation 318 determines a difference between a current position of the input device and the neutral force position of the input device.

Operation 320 generates a force on the input device based on the deviation of the current position of the input device from the neutral force position of the input device. For example, actuator 138 may apply a force to inceptor 110 based on neutral point adjustment signal 230. When the pilot is not resisting the force on inceptor 110, the force applied by actuator 138 will move inceptor 110 towards the neutral position. In some embodiments, a second actuator generates the force on a second input device for a co-pilot of the aircraft.

The embodiments described herein have speed stability. Speed stability describes a tendency of an aircraft to return to a trimmed speed without intervention from the pilot after a disturbance of the aircraft from the trimmed speed. Holding the inceptor at the null position yields a 1G command, so speed changes at 1G can be easily accomplished by holding the controller in a fixed position as the force applied by actuator 138 varies. Trimming the aircraft after or during a speed change is accomplished by holding the inceptor at the position that provides the desired flight path angle and adjusting the pitch trim control until the force required to hold the stick becomes zero.

For example, an increase in engine thrust alone will result in an increase in the flight path angle of the aircraft. In order to maintain a straight and level flight path while increasing engine thrust, the pilot must apply a forward force on the inceptor. To trim the aircraft to maintain this level flight path, the pilot would make nose down trim control inputs until the forward force applied to the inceptor becomes zero. At this point, the pilot will have increased the speed of the aircraft without changing the flight path of the aircraft.

The gradient of the stick changes with aircraft speed to provide speed awareness to the pilot based on the force/displacement gradient. Accordingly, the system provides feedback to the pilot of the aircraft's G-capability without the need for the pilot to wait for the aircraft to maneuver in response to the input.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft comprising:
   a flight control surface; and
   a control-by-wire system comprising:
   an input device configured to control the flight control surface; and
   a controller communicatively coupled with the input device and configured to automatically offset a neutral force position of the input device based on a deviation of the aircraft from a reference condition while the aircraft is operated in a manual flight mode.

2. The aircraft of claim 1, the control-by-wire system further comprising an actuator coupled with the input device and communicatively coupled with the controller, wherein the actuator is configured to provide a force to the input device in response to receiving a signal from the controller.

3. The aircraft of claim 2, wherein the controller is further configured to command the actuator to vary the force based on a difference between a current position of the input device and the neutral force position of the input device.

4. The aircraft of claim 1, the control-by-wire system further comprising secondary controls, and wherein the controller is further configured to determine the reference condition based on a condition of the secondary controls independent of a condition of the input device.

5. The aircraft of claim 4, wherein the secondary controls include a trim control and wherein the controller is further configured to determine the reference condition based on a trim condition of the aircraft.

6. The aircraft of claim 5, wherein the controller is further configured to determine the deviation of the aircraft from the reference condition based on signals received from sensors associated with the aircraft.

7. The aircraft of claim 1, the control-by-wire system further comprising a trim control and the at least one flight control surface further comprising an elevator and a horizontal stabilizer, and wherein the controller is further configured to control the elevator based on a position of the input device and to control the horizontal stabilizer based on an input from the trim control.

8. A control-by-wire system for a vehicle, the control-by-wire system comprising:
   a primary control input device; and
   a controller communicatively coupled with the vehicle and configured to automatically offset a neutral force position of the primary control input device based on a deviation of the vehicle from a reference configuration while the vehicle is operated in a manual operation mode.

9. The control-by-wire system of claim 8, further comprising an actuator coupled with the primary control input device and communicatively coupled with the controller, wherein the actuator is configured to provide a force to the primary control input device in response to receiving a signal from the controller.

10. The control-by-wire system of claim 9, wherein the controller is further configured to command the actuator to vary the force based on a difference between a current position of the primary control input device and the neutral force position of the primary control input device.

11. The control-by-wire system of claim 8, the control-by-wire system further comprising a secondary control input device, and wherein the controller is further configured to determine the reference condition based on a condition of the secondary control input device independent of a condition of the primary control input device.

12. The control-by-wire system of claim 11, wherein the secondary control input device indicates a trim condition of the vehicle, and wherein the controller is further configured to determine the reference condition to be the trim condition.

13. The control-by-wire system of claim 12, wherein the controller is further configured to offset the neutral force position of the primary control input device based on a deviation of a current condition from the trim condition.

14. The control-by-wire system of claim 8, wherein the primary control input device is an inceptor for control of an elevator of an aircraft, and wherein the control-by-wire system further comprising a secondary control input device that is a trim control for control of a horizontal stabilizer of the aircraft.

15. A controller for use with a control-by-wire system, the controller comprising:
    a processor; and
    a memory unit coupled with the processor, the memory unit storing instructions for the processor, wherein the instructions are configured to cooperate with the processor to:
       electronically communicate with an input device configured to control a flight control surface; and
       automatically offset a neutral force position of the input device based on a deviation of an aircraft from a reference condition while the aircraft is operated in a manual flight mode.

16. The controller of claim 15, wherein the instructions are further configured to cooperate with the processor to generate a signal for an actuator that is coupled with the input device, wherein the signal commands the actuator to provide a force to the input device in a direction of the neutral force position.

17. The controller of claim 16, wherein the instructions are further configured to cooperate with the processor to command the actuator to vary the force based on a difference between a current position of the input device and the neutral force position of the input device.

18. The controller of claim 15, wherein the instructions are further configured to cooperate with the processor to determine the reference condition based on a condition of secondary controls of the aircraft independent of a condition of the input device.

19. The controller of claim 18, wherein the instructions are further configured to cooperate with the processor to determine the reference condition based on a trim condition of the aircraft or based on a reference angle-of-attack of the aircraft.

20. The controller of claim 19, wherein the instructions are further configured to cooperate with the processor to determine the deviation from the reference condition based on a current speed of the aircraft or based on a current angle-of-attack of the aircraft.

* * * * *